US010416362B2

(12) United States Patent
Shih

(10) Patent No.: US 10,416,362 B2
(45) Date of Patent: Sep. 17, 2019

(54) HIGH-BRIGHTNESS REFLECTIVE LUMINOUS MEMBRANE, ITS FABRICATING METHOD AND OBJECT ATTACHED WITH SUCH MEMBRANE

(71) Applicant: Ying-Chi Shih, Taipei (TW)

(72) Inventor: Ying-Chi Shih, Taipei (TW)

( * ) Notice: Subject to any disclaimer, the term of this patent is extended or adjusted under 35 U.S.C. 154(b) by 197 days.

(21) Appl. No.: 15/370,316

(22) Filed: Dec. 6, 2016

(65) Prior Publication Data

US 2017/0168201 A1   Jun. 15, 2017

(30) Foreign Application Priority Data

Dec. 9, 2015   (CN) .......................... 2015 1 0905963
Dec. 9, 2015   (CN) ...................... 2015 2 1017880 U

(51) Int. Cl.
*G02B 5/128*   (2006.01)
*A41D 13/01*   (2006.01)
*G09F 13/16*   (2006.01)
*A43B 1/00*    (2006.01)

(52) U.S. Cl.
CPC ............ *G02B 5/128* (2013.01); *A41D 13/01* (2013.01); *G09F 13/16* (2013.01); *A43B 1/0027* (2013.01); *A43B 1/0036* (2013.01); *A43B 1/0072* (2013.01)

(58) Field of Classification Search
CPC . G02B 1/10; G02B 5/128; C25D 7/00; C25D 5/48; G09F 13/16; A41D 13/01; A43B 1/0027

USPC ........................................................ 359/539
See application file for complete search history.

(56) References Cited

U.S. PATENT DOCUMENTS

| | | | |
|---|---|---|---|
| 2005/0195469 A1* | 9/2005 | Van Brocklin | B01J 13/04 |
| | | | 359/296 |
| 2008/0026193 A1* | 1/2008 | Koppes | B32B 27/12 |
| | | | 428/207 |
| 2014/0247491 A1* | 9/2014 | Zhang | G02B 5/128 |
| | | | 359/536 |

FOREIGN PATENT DOCUMENTS

CN        201410261141.9        9/2014

* cited by examiner

*Primary Examiner* — Euncha P Cherry
(74) *Attorney, Agent, or Firm* — Chun-Ming Shih

(57) ABSTRACT

The high-brightness reflective luminous membrane of the present invention comprises (from top to bottom) a reflective layer and an attachment layer. The reflective layer is formed by a plurality of beads held in place by an adhesive. The attachment layer may adhere to a substrate. The beads may be transparent beads, which may reflect white light, or translucent beads, which are plated with metal via galvanization and may reflect colorful light. Either the attachment layer or the reflective layer may be provided with luminous powder, reflective powder, colors (or a first pattern) via coating, spraying, adhesion or printing to form a colorful reflective luminous layer. With the presence of incident light, the membrane can reflect high-brightness white light and/or bright colorful light. In addition, the membrane may exhibit various types of reflected patterns according to the distance to incident light source and brightness of incident light and a viewer's observing angle.

10 Claims, 3 Drawing Sheets

HIGH-BRIGHTNESS REFLECTIVE LUMINOUS MEMBRANE, ITS FABRICATING METHOD AND OBJECT ATTACHED WITH SUCH MEMBRANE

BACKGROUND OF THE INVENTION

1. Field of the Invention

The invention generally relates to a reflective luminous item. More particularly, the invention relates to a high-brightness reflective luminous membrane, its fabricating method and an object attached with such membrane.

2. Description of the Prior Art

A reflective luminous strip/item may be used on apparels, vests, hats, shoes or motor vehicles so as to enhance pedestrians' or vehicles' visibility and thus safety. It may also used on large advertising signs, posters and traffic signs so as to increase their visibility and warning function.

In the prior art, reflective glass beads are directly disposed on a luminous base material; therefore, in such method, firm attachment can not be achieved, the finished surface is quite rough and reflectivity is not enough. Also, the overprint method makes the finished product possessing only one feature (i.e., only has the reflective feature or the luminous feature).

In the patent application no. 201410261141.9 of China, an invention with the title of "a printed fabric with both reflective and luminous features and its fabricating method" was disclosed. Such fabric comprises (from top to bottom) a reflective layer, a fluorescent layer, a layer made by silk screen method or mimeograph and an attachment pattern layer. With the presence of natural light, it appears the same as ordinary fabric. However, in a pitch-dark environment, after it absorbs enough light, its pattern (or heat transfer pattern) radiates visible light. Therefore, it is luminous and reflective. However, its reflective layer is made of transparent glass beads and a base layer; therefore, it can only reflect white light and its reflectivity is only 10 to 15 cd/square meter, which is quite low. In addition, the fabric can not exhibit various types of reflected patterns according to the distance to incident light source and brightness of incident light and a viewer's observing angle.

In the patent application no. 201510288832.2 of China, an invention with the title of "reflective luminous membrane, its fabricating method and its application" was disclosed. Such membrane comprises a reflective layer and an attachment layer. The reflective layer is made of beads held in place by an adhesive. The attachment layer may adhere to a substrate. Its metal-plated beads can reflect colorful light. The attachment layer may be provided with luminous powder and colors (or a first pattern) via coating or printing to form a colorful luminous layer. Or, alternatively, the reflective layer is provided with luminous powder and colors (or a first pattern) via coating, spraying, adhesion or printing to form a colorful luminous layer. With the presence of incident light, the membrane can reflect light as well absorb and radiate light; it is luminous in a pitch-dark environment. In addition, the membrane can exhibit various types of reflected patterns according to the distance to incident light source and brightness of incident light and a viewer's observing angle. However, its reflectivity is only 45 to 100 cd/square meter, which is not sufficient. In addition, its beads are exclusively metal-plated beads, which can reflect colorful light; therefore, such beads make its range of application narrower.

SUMMARY OF THE INVENTION

To overcome the aforesaid disadvantages, the object of the present invention is to provide a reflective luminous membrane with enhanced brightness, its fabrication method a reflective luminous object with enhanced brightness. The reflective luminous membrane may reflect white light or colorful light with enhanced brightness; with a second reflective powder or a pattern, the membrane may reflect bright white light and/or bright colorful light. In addition, the membrane may exhibit various types of reflected patterns according to the distance to incident light source and brightness of incident light and a viewer's observing angle. Moreover, it makes an object that it attaches to superficially, smoother and better feel and firm attachment may be achieved.

To reach the said object, the reflective luminous membrane of the present invention is provided and comprises (from top to bottom) a reflective layer and an attachment layer. The reflective layer is formed by a plurality of reflective beads held in place by an adhesive. The attachment layer may adhere to a substrate.

The beads may be transparent beads, which may reflect white light, or translucent beads, which are plated with metal via galvanization and may reflect colorful light. The attachment layer may be provided with luminous powder, reflective powder, colors (or a first pattern) via coating, spraying, adhesion or printing to form a colorful reflective luminous layer. Or, alternatively, the attachment layer may be provided with luminous powder, reflective powder, colors (or a first pattern) via coating, spraying, adhesion or printing to form a colorful reflective luminous layer.

Or, a plated layer is formed onto and under the reflective layer via galvanization and the attachment layer may be provided with luminous powder, reflective powder, colors (or a first pattern) via coating, spraying, adhesion or printing to form a colorful reflective luminous layer. Or, the reflective layer may be provided with luminous powder, reflective powder, colors (or a first pattern) via coating, spraying, adhesion or printing to form a colorful reflective luminous layer.

Preferably, each of the reflective beads is made of glass, ceramics or synthetic resin. Metals used in the said plating include aluminum, silver, tin, chromium, zinc, a combination thereof. The said reflective power may include pearl powder and reflective metallic powder, which may be made of aluminum, silver, tin, chromium, zinc or a combination thereof.

Preferably, a separable carrier with a separable layer is provided on the surface of the reflective layer and the separable layer is disposed between the separable carrier and the reflective layer. The separable carrier is a thin layer made of PET and the separable layer is made of polyethylene, polypropylene, polybutene, polyvinyl chloride, polyester or a combination thereof.

Preferably, after a reflective powder and another reflective powder with another type of reflective effect or a first pattern are provided via coating, spraying, adhesion or printing onto the attachment layer to form a colorful reflective luminous layer, a white bottom layer may be formed onto the colorful reflective luminous layer.

Preferably, the attachment layer may be made of PU adhesive, TPU adhesive, two-component acrylic acid, methyl carbamate, ester, ether, epoxy, urea, carbonate, acrylate, acrylic acid, olefin, vinyl chloride, amide, alkyd or a combination thereof, and wherein the adhesive may be made of methylcarbamate, ester, ether, epoxy, urea, carbonate, acrylate, acrylic acid, olefins, vinyl chloride, amides, alkyds or a combination thereof.

Preferably, another type of reflective powder and colors (or a second pattern) are provided via coating, spraying, adhesion or printing onto the reflective layer to form a superficial colorful layer.

In the second aspect of the present invention, a method to fabricate the reflective luminous membrane with enhanced brightness comprises the following four-plus-two steps:

(1) First, prepare a separable carrier with a separable layer, which is disposed on the separable carrier (2) Use an adhesive to adhere transparent beads, which may reflect white light, or translucent beads, which are plated with metal via galvanization and may reflect colorful light, to the lower surface of the separable layer to form a reflective layer; or, use an adhesive to adhere beads to the lower surface of the separable layer to form a reflective layer and form a plated layer onto and under the reflective layer via galvanization (3) Dispose an attachment layer, which may adhere to a substrate, under the reflective layer or plated layer (4) Provide the attachment layer with a reflective powder of another type and colors or a first pattern onto by coating, spraying, adhesion or printing so as to form a colorful reflective luminous layer. Or, alternatively, provide the reflective layer with luminous powder, a reflective powder of another type and colors or a first pattern onto by coating, spraying, adhesion or printing so as to form a colorful reflective luminous layer.

Preferably, there are two additional steps after (4):

(5) Adhere the attachment layer to and over a substrate and then separate the separable carrier and separable layer from the rest of the reflective luminous membrane (6) Provide the reflective layer with a second pattern, colors or another type of reflective powder via coating, spraying, adhesion or printing to form a superficial colorful layer.

Preferably, the following is another step that may be used: A white bottom layer may be formed onto the colorful reflective luminous layer.

In application, a reflective luminous object with high brightness may include a main body and the membrane of the present invention. Such main body may be fabricated via weaving, coating, spraying, printing, injection molding, polyurethane doming, adhesion, 3-D printing, etc. the membrane of the present invention may be attached to or connected with such main body to form such a reflective luminous object.

Such objects or materials may include textile fabrics, non-woven fabrics, leather, plastic, rubber, paper, metals, wood, clothing, luggage, bags, hats, shoes, socks, umbrellas, boxes, signs, stickers, tapes, raincoats, advertising signs, posters, computer panels, TV screens, liquid crystal panels, components and parts thereof (such as the luminous or reflective components of computers or TV displays). The membrane of the present invention may also be incorporated into finished goods and accessories.

In comparison to the prior art, the reflective luminous membrane of the present invention has the following four advantages:

1. The reflective powder, reflective powder and colors (or a first pattern) provided via coating, spraying, adhesion or printing onto the attachment layer to form a colorful reflective luminous layer have a high level of reflectivity. Other parts of the membrane may absorb and then radiate light. Therefore, these features can greatly increase its warning function and thus its safety.

2. Thanks to the transparent beads (which may reflect white light), the translucent beads (which are plated with metal via galvanization and may reflect colorful light), the reflective powder (provided via coating, spraying, adhesion or printing) with another type of reflective effect and the luminous powder, we can see the pattern or colors radiating from the colorful reflective luminous layer before the membrane of the present invention starts to reflect light; with the presence of incident light, the membrane can reflect bright white light or bright colorful light, reflect bright white light and average-bright white light or reflect both bright white light and colorful light. In addition, the membrane may exhibit various types of reflected patterns according to the distance to incident light source, brightness of incident light and a viewer's observing angle. A clear pattern may be seen from the membrane with or without the presence of incident light and in a pitch-dark environment. Therefore, the membrane has great effects of reflectivity and luminosity, greatly increasing visibility and thus its warning function and safety and also enhancing its security/anti-forgery function and appearances.

3. The pattern or colors provided via coating, spraying, adhesion or printing onto the attachment layer may become more emphasized and stand out with the presence of very-bright white light, regular-bright white light or very-bright colorful light, enhancing its appearances.

4. The membrane of the present invention can make a main body to which it attaches superficially smoother and also improve the latter's feel and firmness.

LIST OF REFERENCE NUMERALS

| 1 Reflective beads | 2 Reflective layer |
|---|---|
| 3 Attachment layer | 4 Colorful reflective luminous layer |
| 5 Separable carrier | 6 Superficial colorful layer |
| 7 Plated layer | 8 Separable layer |
| 9 White bottom layer | |

DETAILED DESCRIPTION OF THE PREFERRED EMBODIMENT

The objects, technical aspects and advantages of the present invention may become more understandable if the following description is read with reference to the drawings. Many changes and modifications in the above described embodiments of the invention can, of course, be carried out without departing from the scope thereof and should be deemed as protected by the patent right of the present invention.

Figure 1:
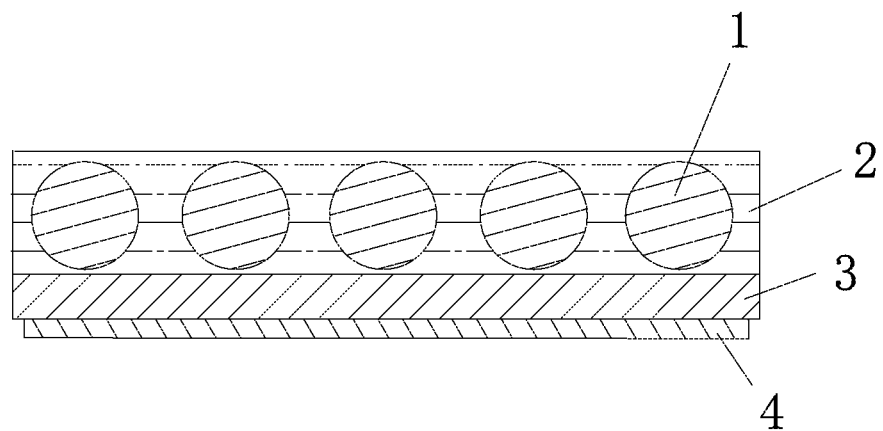
FIG. 1 is a sectional view schematically illustrating the first embodiment of the high-brightness reflective luminous membrane of the present invention.

First, please refer to FIG. 1, which illustrates the high-brightness reflective luminous membrane of the present invention. The membrane comprises a reflective layer 2, an attachment layer 3 and a colorful reflective luminous layer 4. The reflective layer 2 is constructed by a plurality of reflective beads 1 which are held in place by an adhesive. The attachment layer 3 may be attached to a substrate.

Each of the reflective beads 1 is made of glass, ceramics or synthetic resin. In this embodiment, each of the reflective beads 1 is made of glass and these glass beads have the mesh size of 20 to 400 and their coefficient of reflection is 1.5.

In addition, the reflective beads 1 may be glass beads, which may reflect white light, or metal-plated glass beads, which may reflect colorful light so as to provide the reflective luminous membrane with different types of reflected patterns or colors according to the angle of, distance to and brightness of incident light. Such metal-plated glass beads may be plated via galvanization with aluminum, silver, tin, chromium, zinc, a combination thereof or a compound thereof.

The adhesive may hold reflective beads 1 in place via coating, lamination or embossing. The adhesive may be made of methylcarbamate, ester, ether, epoxy, urea, carbonate, acrylate, acrylic acid, olefins, vinyl chloride, amides, alkyds or a combination thereof.

The attachment layer 3 may be made of PU adhesive, TPU adhesive, two-component acrylic acid, methyl carbamate, ester, ether, epoxy, urea, carbonate, acrylate, acrylic acid, olefin, vinyl chloride, amide, alkyd or a combination thereof. Other types of adhesive may also be used.

The attachment layer 3 may be provided with luminous powder, reflective powder, colors (or a first pattern) via coating, spraying, adhesion or printing to form a colorful reflective luminous layer 4. The reflective power may be pearl powder or reflective metallic powder, which may be made of aluminum, silver, tin, chromium, zinc or a combination thereof. The metallic powder may be colored (such as dark grey or silver color), so as to make up the first pattern. The first pattern or colors may be formed onto the attachment layer 3 by computer printing, screen printing, ink jet printing, embossing/die stamping or other types of printing method. As the reflective luminous membrane of the present invention is attached to any type of surface, the attachment layer 3 would allow its luminous powder, reflective powder and colors/pattern to be transferred to that surface.

In the first embodiment of the reflective luminous membrane of the present invention, the corresponding fabricating method comprises the following five steps:

(1) First, prepare a separable carrier 5 with a separable layer 8, which is disposed on the separable carrier 5.
(2) Use an adhesive to adhere transparent beads 1, which may reflect white light, or translucent beads 1, which are plated with metal via galvanization and may reflect colored light, to the lower surface of the separable layer 8 to form a reflective layer 2.
(3) Dispose an attachment layer 3 under the reflective layer 2 and the attachment layer 3 may adhere to a substrate.
(4) Provide the attachment layer 3 with luminous powder, reflective powder and colors/a first pattern via coating, spraying, adhesion or printing to form a colorful reflective luminous layer 4.
(5) Attach the attachment layer 3 to the surface of the substrate and separate the separable carrier 5 and separable layer 8 from the rest of the reflective luminous membrane.

Figure 2:
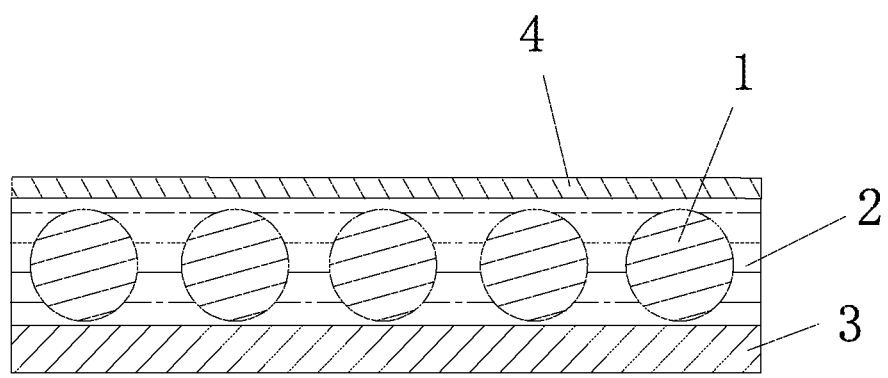
FIG. 2 is a sectional view schematically illustrating the second embodiment of the high-brightness reflective luminous membrane of the present invention.

Now, please refer to FIG. 2, which illustrates a second embodiment of the reflective luminous membrane of the present invention. The reflective luminous membrane comprises a colorful reflective luminous layer 4, a reflective layer 2 and an attachment layer 3. The reflective layer 2 is constructed by a plurality of reflective beads 1 which are held in place by an adhesive. The attachment layer 3 may be attached to a substrate. The differences between the second embodiment of the reflective luminous membrane and the first embodiment of the reflective luminous membrane are: (1) In the second embodiment, luminous powder, reflective powder and colors (or a first pattern) via coating, spraying, adhesion or printing are provided onto the reflective layer 2, instead of the attachment layer 3, to form a colorful reflective luminous layer 4 (2) In the second embodiment, the colorful reflective luminous layer 4 is disposed on the top level of the membrane.

In the second embodiment of the reflective luminous membrane of the present invention, the corresponding fabricating method comprises the following 5 steps:

(1) First, prepare a separable carrier 5 with a separable layer 8, which is disposed on the separable carrier 5.
(2) Use an adhesive to adhere the transparent beads 1, which may reflect white light, or the translucent beads 1, which are plated with metal via galvanization and may reflect colorful light, to the lower surface of the separable layer 8 to form a reflective layer 2.
(3) Dispose an attachment layer 3, which may adhere to a substrate, under the reflective layer 2.
(4) Adhere the attachment layer 3 to a substrate and then separate the separable carrier 5 and separable layer 8 from the rest of the reflective luminous membrane.
(5) Provide the reflective layer 2 with luminous powder, reflective powder and colors or a first pattern via coating, spraying, adhesion or printing to form a colorful reflective luminous layer 4.

Figure 3:
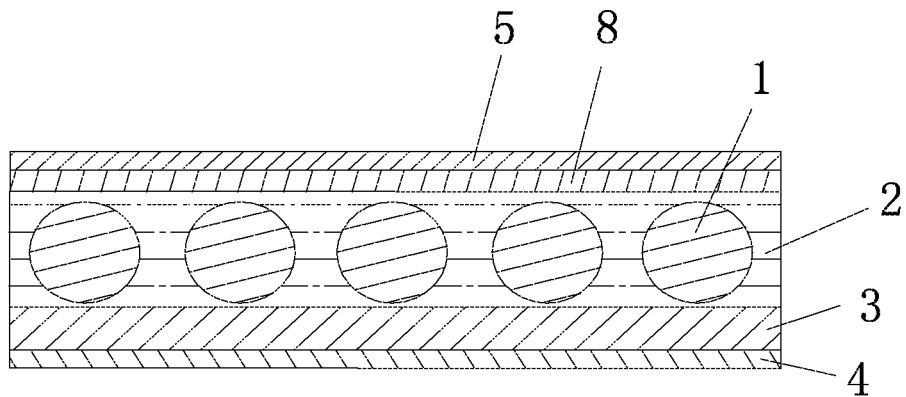
FIG. 3 is a sectional view schematically illustrating the third embodiment of the high-brightness reflective luminous membrane of the present invention.

Next, please refer to FIG. 3, which illustrates a third embodiment of the reflective luminous membrane of the present invention. The reflective luminous membrane comprises a separable carrier 5 with a separable layer 8, a reflective layer 2, an attachment layer 3 and a colorful reflective luminous layer 4. The reflective layer 2 is constructed by a plurality of reflective beads 1 which are held in place by an adhesive. The attachment layer 3 may be attached to a substrate. The difference between the third embodiment of the reflective luminous membrane and the first embodiment of the reflective luminous membrane is: In the third embodiment, the separable carrier 5 with a separable layer 8 is disposed on top of the reflective layer 2 and the separable layer 8 is sandwiched by and between the separable carrier 5 and the reflective layer 2. Preferably, the separable carrier 5 is a PET membrane or other type of carrier. The separable layer 8 is made of polyethylene, polypropylene, polybutene, polyvinyl chloride, polyester or a combination thereof.

The separable carrier 5 acts as a base layer in the fabrication to allow the reflective beads 1 to adhere to the separable layer 8. Then, adhesive is applied to form a reflective layer 2 that has an even surface. The adhesive also serves to hold the reflective beads 1 in place.

In the third embodiment of the reflective luminous membrane of the present invention, the corresponding fabricating method comprises the following 4 steps:

(1) First, prepare a separable carrier 5 with a separable layer 8, which is disposed on the separable carrier 5.
(2) Use an adhesive to adhere the transparent beads 1, which may reflect white light, or the translucent beads 1, which are plated with metal via galvanization and may reflect colorful light, to the lower surface of the separable layer 8 to form a reflective layer 2.
(3) Dispose an attachment layer 3, which may adhere to a substrate, under the reflective layer 2.
(4) Provide the attachment layer 3 with luminous powder, reflective powder and colors or a first pattern via coating, spraying, adhesion or printing to form a colorful reflective luminous layer 4.

Figure 4:
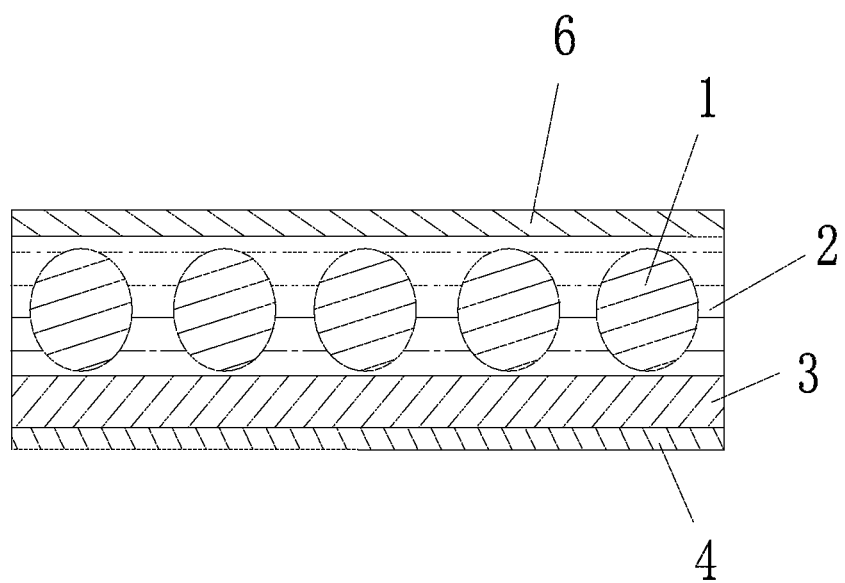
FIG. 4 is a sectional view schematically illustrating the fourth embodiment of the high-brightness reflective luminous membrane of the present invention.

Now, please refer to FIG. 4, which illustrates a fourth embodiment of the reflective luminous membrane of the present invention. The reflective luminous membrane comprises (from top to bottom) a superficial colorful layer 6, a reflective layer 2, an attachment layer 3 and a colorful reflective luminous layer 4. The reflective layer 2 is constructed by a plurality of reflective beads 1 which are held in place by an adhesive. The attachment layer 3 may be attached to a substrate. The differences between the fourth embodiment and the first embodiment are: (1) In the fourth embodiment, reflective powder of another type and colors (or a second pattern) are provided via coating, spraying, adhesion or printing onto the reflective layer 2 to form a superficial colorful layer 6 (2) In the fourth embodiment, the superficial colorful layer 6 is disposed on the top level of the membrane.

The said superficial colorful layer 6 so formed on top of the reflective layer 2 may show the said colors or the second pattern with the presence of high-brightness white light, average-brightness white light or colorful light, embellishing the reflective layer 2. Moreover, several superficial colorful layers 6 may be provided so as to protect the inner layers against wear and tear.

In the fourth embodiment of the reflective luminous membrane of the present invention, the corresponding fabricating method comprises the following 6 steps:

(1) First, prepare a separable carrier 5 with a separable layer 8, which is disposed on the separable carrier 5.
(2) Use an adhesive to adhere the transparent beads 1, which may reflect white light, or the translucent beads 1, which are plated with metal via galvanization and may reflect colorful light, to the lower surface of the separable layer 8 to form a reflective layer 2.
(3) Dispose an attachment layer 3, which may adhere to a substrate, under the reflective layer 2.
(4) Provide the attachment layer 3 with luminous powder, reflective powder, colors (or a first pattern) via coating, spraying, adhesion or printing to form a colorful reflective luminous layer 4.
(5) Adhere the attachment layer 3 to a substrate and then separate the separable carrier 5 and separable layer 8 from the rest of the reflective luminous membrane.
(6) Provide reflective powder of another type and colors (or a second pattern) are provided via coating, spraying, adhesion or printing onto the reflective layer 2 to form a superficial colorful layer 6.

Figure 5:
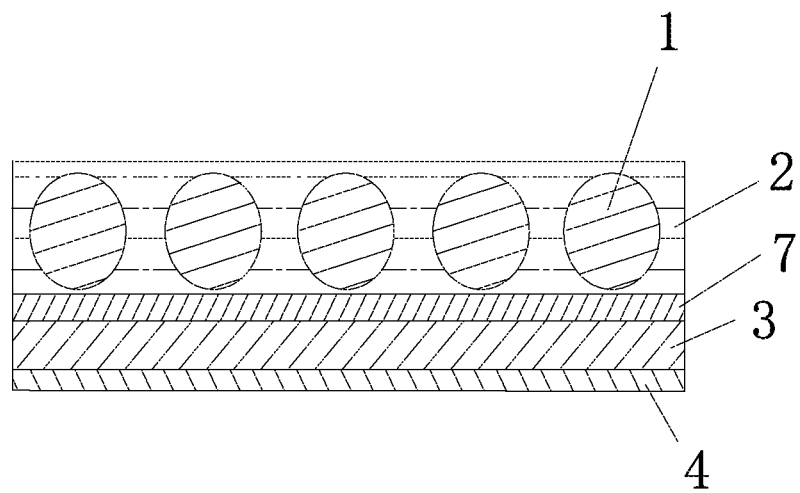
FIG. 5 is a sectional view schematically illustrating the fifth embodiment of the high-brightness reflective luminous membrane of the present invention.

Next, please refer to FIG. 5, which illustrates a fifth embodiment of the reflective luminous membrane of the present invention. The reflective luminous membrane comprises (from top to bottom) a reflective layer 2, a plated layer 7, an attachment layer 3 and a colorful reflective luminous layer 4. The reflective layer 2 is constructed by a plurality of reflective beads 1 which are held in place by an adhesive. The plated layer 7 is disposed under the reflective layer 2. The attachment layer 3 may be attached to a substrate. The differences between the fifth embodiment of the reflective luminous membrane and the first embodiment of the reflective luminous membrane are: In the fifth embodiment, the beads are not plated with any metal via galvanization and the plated layer 7 disposed under the reflective layer 2 may enable the beads to reflect colorful light.

In the fifth embodiment of the reflective luminous membrane of the present invention, the corresponding fabricating method comprises the following five steps:

(1) First, prepare a separable carrier 5 with a separable layer 8, which is disposed on the separable carrier 5.
(2) Use an adhesive to adhere the transparent beads 1 onto the separable layer 8 to form a reflective layer 2 and form a plated layer 7 under the reflective layer 2 via galvanization.
(3) Dispose an attachment layer 3, which may adhere to a substrate, under the plated layer 7.
(4) Provide the attachment layer 3 with luminous powder, reflective powder and colors (or a first pattern) via coating, spraying, adhesion or printing to form a colorful reflective luminous layer 4.
(5) Adhere the attachment layer 3 to a substrate and then separate the separable carrier 5 and separable layer 8 from the rest of the reflective luminous membrane.

Alternatively, in the fifth embodiment of the reflective luminous membrane of the present invention, the colorful reflective luminous layer 4 may be directly disposed on the reflective layer 2; in addition, a superficial colorful layer may be formed on the reflective layer 2 by providing a second pattern, colors or reflective powder via coating, spraying, adhesion or printing onto the reflective layer 2. A single plated layer 7 may be disposed on the top of the reflective layer 2; alternatively, a plated layer 7 is provided over the reflective layer 2 and another plated layer 7 is provided under the reflective layer 2.

In the embodiments of the reflective luminous membrane of the present invention, the metal-plated glass beads may radiate colorful light and the colorful reflective luminous layer may exhibit a colorful pattern, which, with the presence of incident light, may change according to the distance to incident light source and brightness of incident light and a viewer's observing angle. For example, at a certain angle, some area may appear colorful and the other area may appear high-brightness white.

Figure 6:
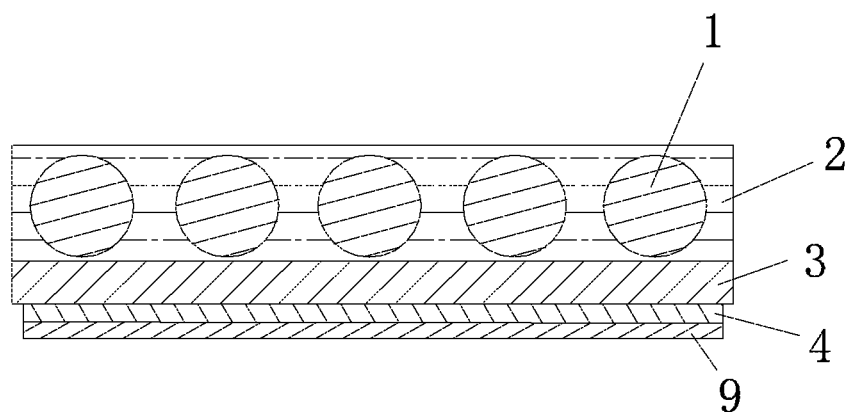
FIG. 6 is a sectional view schematically illustrating the sixth embodiment of the high-brightness reflective luminous membrane of the present invention.

Now, please refer to FIG. 6, which illustrates a sixth embodiment of the reflective luminous membrane of the present invention. The reflective luminous membrane comprises (from top to bottom) a reflective layer 2, an attachment layer 3, a colorful reflective luminous layer 4 and a white bottom layer 9. The reflective layer 2 is constructed by a plurality of reflective beads 1 which are held in place by an adhesive. The attachment layer 3 may be attached to a substrate. The difference between the sixth embodiment of the reflective luminous membrane and the first embodiment of the reflective luminous membrane is: In the sixth embodiment, the white bottom layer 9 is provided; it may highlight and enhance the luminous effect and it is disposed onto and under the colorful reflective luminous layer 4.

In the sixth embodiment of the reflective luminous membrane of the present invention, the corresponding fabricating method comprises the following six steps:

(1) First, prepare a separable carrier 5 with a separable layer 8, which is disposed on the separable carrier 5.
(2) Use an adhesive to adhere the transparent beads 1, which may reflect white light, or the translucent beads 1, which are plated with metal via galvanization and may reflect colorful light, to the lower surface of the separable layer 8 to form a reflective layer 2.
(3) Dispose an attachment layer 3, which may adhere to a substrate, under the reflective layer 2.
(4) Provide the attachment layer 3 with luminous powder, reflective powder and colors (or a first pattern) via coating, spraying, adhesion or printing to form a colorful reflective luminous layer 4.
(5) Form a white bottom layer 9 onto and under the colorful reflective luminous layer 4.
(6) Adhere the attachment layer 3 to a substrate and then separate the separable carrier 5 and separable layer 8 from the rest of the reflective luminous membrane.

In actual usage, the reflective luminous membrane of the present invention may be used on or for items that are fabricated by means of weaving, coating, printing, injection molding, adhesion, polyurethane doming, 3-D printing, etc. to form as a reflective/luminous object, which is characterized with the high levels of reflectivity and luminosity as well as variation in pattern. As the reflective luminous membrane of the present invention is adhered to a substrate, the appropriate temperatures may be in the range from the room temperature to 280 degree C., which depends on the type of adhesive and the properties of the corresponding substrate.

When we adhere the reflective luminous membrane to an object or a substrate, we may apply an adhesive to the former's bottom surface or to the latter's top surface; also, we may apply the adhesive to the both surfaces.

Such objects or materials may include textile fabrics, non-woven fabrics, leather, plastic, rubber, paper, metals, wood, clothing, luggage, bags, hats, shoes, socks, umbrellas, boxes, signs, stickers, tapes, raincoats, advertising signs, posters, computer panels, TV screens, liquid crystal panels, components and parts thereof (such as the luminous or reflective components of computers or TV displays). The membrane of the present invention may also be incorporated into finished goods and accessories.

In conclusion, the reflective luminous membrane of the present invention may reflect, absorb and radiate light, enabling it to send out light even in a pitch-dark environment. In addition, thanks to its reflective elements and reflective powder, its brightness and reflectivity may be enhanced. Its metal-plated translucent elements and reflective powder of another type may also enhance its brightness and reflectivity. Other parts of the membrane may reflect colorful light and exhibit different visible patterns according to the distance to incident light source and brightness of incident light and a viewer's observing angle. Therefore, the member of the present invention possesses a reflectivity several times stronger than its counterparts of the prior art. Lab tests have confirmed that its brightness and reflectivity may reach more than 150 cd/square meter, greatly increasing its warning function and its safety and also enhancing its security/anti-forgery function and appearances.

Many changes and modifications in the above described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A high-brightness reflective luminous membrane, comprising a reflective layer, an attachment layer and a colorful reflective luminous layer, wherein the reflective layer is constructed by a plurality of reflective beads which are held in place by an adhesive and the attachment layer being attached to a top surface of the colorful reflective luminous layer; wherein the reflective beads are glass beads that reflect white light, or translucent metal-plated glass beads that reflect colorful light; wherein a reflective powder, a luminous powder, and colors or a first pattern are provided onto either the attachment layer or the reflective layer by coating, spraying, adhesion or printing so as to form a colorful reflective luminous layer, wherein the reflective layer and the colorful reflective luminous layer cooperate to reflect high-brightness white light; or, a plated layer is formed via galvanization and a reflective powder and colors or a first pattern are provided onto the attachment layer by coating, spraying, adhesion or printing to form a colorful reflective luminous layer; or, a reflective powder and colors or a first pattern are provided onto the reflective layer by coating, spraying, adhesion or printing to form a colorful reflective luminous layer.

2. The high-brightness reflective luminous membrane as in claim 1, wherein each of the reflective beads is made of glass, ceramics or synthetic resin and the said metal-plated glass beads are plated with aluminum, silver, tin, chromium, zinc, a combination thereof or a compound thereof via galvanization, and wherein the said reflective powder is pearl powder or reflective metallic powder, which may be aluminum, silver, tin, chromium, zinc or a combination thereof.

3. The high-brightness reflective luminous membrane as in claim 1, wherein a separable carrier with a separable layer is provided on the surface of the reflective layer and the separable layer is disposed between the separable carrier and the reflective layer, and wherein the separable carrier is a thin layer made of PET and the separable layer is made of polyethylene, polypropylene, polybutene, polyvinyl chloride, polyester or a combination thereof.

4. The high-brightness reflective luminous membrane as in claim 1, wherein the attachment layer is provided with a reflective powder- and colors or a first pattern via coating, spraying, adhesion or printing to form a colorful reflective luminous layer, under which a white bottom layer is provided.

5. The high-brightness reflective luminous membrane as in claim 1, wherein the attachment layer is made of PU adhesive, TPU adhesive, two-component acrylic acid, methyl carbamate, ester, ether, epoxy, urea, carbonate, acrylate, acrylic acid, olefin, vinyl chloride, amide, alkyd or a combination thereof, and wherein the adhesive is made of methylcarbamate, ester, ether, epoxy, urea, carbonate, acrylate, acrylic acid, olefins, vinyl chloride, amides, alkyds or a combination thereof.

6. The high-brightness reflective luminous membrane as in claim 1, wherein the reflective layer is provided with a second pattern and colors or reflective powder via coating, spraying, adhesion or printing to form a superficial colorful layer.

7. A method to fabricate the high-brightness reflective luminous membrane, comprising the following four steps:
(1) First, prepare a separable carrier with a separable layer, which is disposed on the separable carrier;

(2) Use an adhesive to adhere transparent beads, which may reflect white light, or translucent beads, which are plated with metal via galvanization and reflect colorful light, to the lower surface of the separable layer to form a reflective layer; or, use an adhesive to adhere beads to the lower surface of the separable layer to form a reflective layer and form a plated layer onto and under the reflective layer via galvanization;

(3) Dispose an attachment layer, which adheres to a substrate, under the reflective layer or plated layer;

(4) Provide the attachment layer with a reflective powder, a luminous powder, and colors or a first pattern onto by coating, spraying, adhesion or printing so as to form a colorful reflective luminous layer; Or, provide the reflective layer with luminous powder, a reflective powder and colors or a first pattern onto by coating, spraying, adhesion or printing so as to form a colorful reflective luminous layer, wherein the reflective layer and the colorful reflective luminous layer cooperate to reflect high-brightness white light.

8. The fabricating method as in claim 7, further comprises the following two steps after (4): (5) Adhere the attachment layer to and over a substrate and then separate the separable carrier and separable layer from the rest of the reflective luminous membrane and (6) Provide the reflective layer with a second pattern, colors or reflective powder via coating, spraying, adhesion or printing to form a superficial colorful layer.

9. The high-brightness reflective luminous membrane as in claim 7, comprising a further step: a white bottom layer formed onto the colorful reflective luminous layer after the luminous powder, the reflective powder, colors or a first pattern are formed via coating, spraying, adhesion or printing onto the attachment layer to form a colorful reflective luminous layer.

10. A high-brightness reflective luminous object, which is provided with the reflective luminous membrane as in any one from claims 1 to 6 and which is attached to the main portion of the object, wherein such main portion includes textile fabrics, non-woven fabrics, leather, plastic, rubber, paper, metals, wood, clothing, luggage, bags, hats, shoes, socks, umbrellas, boxes, signs, stickers, tapes, raincoats, advertising signs, posters, computer panels, TV screens, liquid crystal panels, reflective luminous or electroluminescent parts/members for computer or TV, etc.

* * * * *